Patented July 2, 1929.

1,719,534

UNITED STATES PATENT OFFICE.

MELVILLE F. COOLBAUGH AND JOHN BURNS READ, OF DENVER, COLORADO.

TREATMENT OF SULPHUR-BEARING MINERALS.

No Drawing.  Application filed June 27, 1924.  Serial No. 722,867.

This invention relates to the roasting of sulphur bearing minerals with chlorides, and has for its object the conversion of the valuable constituents of the minerals into sulfates from which such values can readily be recovered by leaching methods. This method of roasting can be advantageously applied for the recovery of copper, lead, zinc, gold and silver, and for any other metals from ores, mattes, etc., where a strong oxidizing roast is an essential step in such recovery. It is applicable to sulphide minerals, or to any mixture of sulphide minerals with oxidized minerals, and is of especial importance in the treatment of complex ores, concentrates and mattes.

Heretofore, roasting with chlorides (usually sodium chloride) has had for its object the conversion of other metallic compounds into chlorides. Chloridizing roasting of copper, silver, and to a lesser extent, gold minerals, and subsequently leaching them with either water, acid, brine, hypo or cyanide solutions, has been practiced for many years. More recently, chloridizing roasting having for its object, not only the production of chlorides, but the volatilization (chloridizing volatilizing) of these chlorides at a high temperature, has been advocated. Some of the metallic chlorides are not decomposed in the presence of oxygen at their volatilization temperatures, while others are readily converted into oxides or oxychlorides, which are less volatile. In this way, separations can be effected. The production of chlorides, in chloridizing roasting, as practiced in the past, has been accomplished, largely through the interaction of ferric sulphate and copper sulphate with sodium chloride, as shown by the equations:

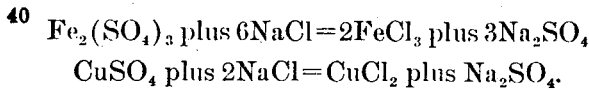

$$Fe_2(SO_4)_3 \text{ plus } 6NaCl = 2FeCl_3 \text{ plus } 3Na_2SO_4$$
$$CuSO_4 \text{ plus } 2NaCl = CuCl_2 \text{ plus } Na_2SO_4.$$

At an efficient temperature for these reactions, ferric and cupric chlorides will decompose, first into the lower chlorides of iron and copper, and finally, in the presence of air, into the oxides with the liberation of gaseous chlorine. This in turn attacks other minerals, especially silver, forming chlorides. The presence of lead and zinc minerals in the charge in chloridizing roasting has never been considered an advantage, since it is known that the sulphates of these metals do not react with chlorides with the subsequent liberation of chlorine. The sulphides of these metals also are regarded as quite indifferent in chloridizing. Any chlorides of these metals which do form tend to volatilize thus carrying the chloride out of the charge. Chloridizing roasting as practiced at present, upon a sulphide mineral will produce a calcine containing a mixture of chlorides and sulphates.

While it has been stated that the presence of chlorides may assist in effecting oxidation in chloridizing roasting, the fact that this is the most important function of the chloride in a sulfatizing roast has never been recognized, and no means have ever been employed to emphasize this characteristic, or attempts made to obtain maximum oxidation from a given amount of chloride. The present practice of adding a reducing agent (coal or other carbonaceous matter) with salt to the ore to be chloridized shows most conclusively that maximum oxidation is not sought, and that its influence is not recognized.

Our invention is characterized by the fact that it produces maximum oxidation of a sulphide mineral by causing sulphur trioxide, sulphur dioxide and oxygen to come in contact with a chloride, which will result in the formation of sulphates and in the liberation of the maximum quantity of chlorine gas. This chlorine gas, as it is first liberated, is in the nascent state and is one of the strongest oxidizing agents known. It will react upon sulphide minerals, oxidizing the sulphur, with the formation of sulphur-chlorine compounds; it may react upon metals, forming chlorides which in turn react again with sulphur gases and oxygen with the further formation of sulphates and again liberating nascent chlorine; it may react with sulphur dioxide, thus oxidizing the sulphur to a higher state and making possible the more rapid production of sulphates; finally, it may react with water vapor, liberating oxygen and producing hydrochloric acid which may act upon oxides or metals in the formation of chlorides, to be acted upon again by sulphur gases and oxygen, forming sulphates and nascent chlorine. By employing the above principles, the chlorine becomes a catalyzing agent which, in the presence of an excess of sulphur gases and oxygen, is not left in the system as a metallic chloride when sufficient time is allowed for the chemical reactions to be carried to completion but is evolved as gaseous chlorine compounds which pass out of the stack.

In order to carry into effect the characteristic features of this invention as given above, the ore or concentrate is roasted as described in our co-pending application Serial No. 340,888. The sulphide minerals to be roasted, the air for oxidation, together with the gaseous products of the roast, and a quantity of a mineral chloride are caused to travel together, in the same direction through the furnace. It is immaterial what type of furnace is used or what direction of travel the materials take. The ore and air may be fed at the top of a super-imposed hearth furnace and travel downward, they may be fed at one end of a horizontal furnace and travel to the other end, or the ore as a powder may be blown with the air upward through a vertical furnace. The con-current movement, however, of solids and gases is an essential in this process. The chlorides may be introduced into the furnace at the same time with the ore or concentrate and the air, or it may be introduced at any stage thereafter, when the ore has been partially roasted, or when the roast is nearing completion. When the sulphur content of the ore is high it is generally advisable to give a partial roast before introducing the chloride. The quantity of chloride used will necessarily vary between wide limits, depending on the quantity of minerals to be oxidized. To expel all the chlorides from the calcine as it is discharged from the furnace, the quantity of chloride employed in the roast must be somewhat less than an equivalent of the sulphide sulphur content of the ore, which is illustrated by the equations for roasting pyrite in the presence of air and sodium chloride:

$$2FeS_2 \text{ plus } 11O = 4SO_2 \text{ plus } Fe_2O_3$$

$$4SO_2 \text{ plus } 8NaCl \text{ plus } 4O_2 = 4Na_2SO_4 \text{ plus } 4Cl_2$$

A quantity of sodium chloride as small as ½ of one percent of the weight of the ore has shown a remarkable effect in eliminating the last traces of sulphide sulphur and eccelerating the formation of sulphates. It is also conceivable that as much as 10% of salt (100 lbs. NaCl per ton of ore) might prove advantageous with certain minerals. It makes little difference what chloride is used for this process, since all of them will react with sulphur gases and oxygen, forming sulphates and liberating chlorine. Sodium chloride is generally employed since it is generally cheaper and occurs more universally than the others. Experiments have shown that very efficient liberation of chlorine may be expected from calcium, lead, zinc, iron, copper and silver chlorides when heated in the presence of sulphur gases and oxygen. Hydrochloric acid is an important factor in decomposing many minerals. Water vapor may therefore be added during roasting to produce this acid which produces metallic chlorides and these in turn are converted to sulphates by sulphur gases. Sulphur trioxide is more efficient than sulphur dioxide in the liberation of chlorine from a chloride, because of its higher state of oxidation. The following equations illustrate this point by showing that twice as much oxygen is required for the second as for the first reaction:

$$SO_3 \text{ plus } 2NaCl \text{ plus } O = Na_2SO_4 \text{ plus } Cl_2$$

$$SO_2 \text{ plus } 2NaCl \text{ plus } O_2 = Na_2SO_4 \text{ plus } Cl_2$$

These equations show the necessity for the presence of oxygen as well as sulphur gases in the liberation of chlorine and the formation of sulphates. It is, therefore, highly advantageous that as great a quantity of sulphur trioxide ($SO_3$) be produced as possible, and this is accomplished by bringing sulphur dioxide over highly oxidized compounds of iron, copper, manganese, etc. ($Fe_2O_3$, $CuO$, $MnO_2$), which act catalytically in the presence of oxygen to form sulphur trioxide. Efficient temperatures for the formation of sulphur trioxide will not be less than 500 deg. C. and may be as high as 900 deg. C. with 550 deg. C. to 750 deg. C. probably the most efficient. These temperatures, since they are above the decomposition temperatures of some sulphates, should be lowered toward the end of the roast if the maximum amounts of sulphates are desired in the calcine. The temperatures a which sulphur gases and oxygen react with chlorides vary with the different chlorides, but become efficient above 450 deg. C. The quantity of sulphur as sulphide mineral which may be present as the effective agent in liberating the chlorine from the chloride may vary between wide limits. Quantities less than 1% may have a very decided effect. The sulphur content should be in excess of the equivalent necessary to react with the chloride. Any deficiency in sulphur can be overcome by addition of a sulphur mineral from an independent source.

The process is worked successfully by roasting with salt a concentrate having an average analysis of 0.5 ounces of gold, 16 ounces of silver per ton, 10% lead, 5% copper, 25% zinc, 15% iron, 8% silica, 30% sulphur and small percentages of manganese, calcium and magnesium. The amount of salt used is two per cent of the weight of the concentrate and is added after the sulphide sulphur content has been reduced below 10%. The time of treatment ranges from two to six hours with the temperatures varying between 500° C. and 700° C. Copper ores and concentrates varying from 8 to 18 percent copper were treated as above described rendering from 95 to 99 percent of the copper soluble as copper sulphate.

By this process, it becomes practical to treat ores containing copper, lead, zinc, gold and silver and many other ores, either separately or in combination, such as complex ores and mattes, with an assurance of efficient recoveries and low treatment costs. When this roast is applied to a complex ore containing an excess of sulphur, the lead in the calcine will be completely in the form of normal sulphate, and readily soluble in brine (NaCl) solution. The copper and zinc as sulphates are soluble in water. Small quantities of sulphuric acid may be used to further convert oxides to sulphates. The silver as sulphate is soluble in water, in water and brine, hypo or cyanide solutions. The major portion of the gold will remain in the calcine in the metallic state which is readily soluble in cyanide or chlorine solutions, or in a brine solution in the presence of an oxidizing agent which will liberate chlorine. There is, however, from this roast always a minor portion of the gold which will go into solution with brine or hypo. From the above, it is seen that many effective combinations for leaching the calcine can be made. If the ultimate form of zinc desired is the sulphate then care should be taken to remove all of the chlorine and chloride by employing an excess of sulphur gases. If electrolysis is to be used for the recovery of the zinc and copper, the same care about chlorine and chlorides should be exercised, since mixed chlorides and sulphates are undesirable in the electrolysis of these metals. The lead taken into solution with the brine may be precipitated by electrolysis, by a metal, such as iron which is higher than lead in the electromotive series, or by other precipitants such as lime. Gold and silver may be recovered from solutions of these metals by electrolysis or by the ordinary metal or other precipitants.

In the claims the term sulphur minerals is intended to include minerals containing sulphur; sulphide ores and minerals; any mixture of minerals containing sulphur with oxidized minerals, complex ores, mattes, etc. singly or collectively.

What we claim is:

1. The method of treating sulphur containing minerals to form metallic sulphates, comprising roasting the minerals in the presence of a chloride and causing sulphur trioxide, sulphur dioxide and oxygen to come in contact with the chloride, the amount of sulphur gases in the roast exceeding that necessary to expel all the chloride, and moving the minerals and gases in the same direction throughout the roasting operation.

2. The method of treating sulphur containing minerals to form metallic sulphates, comprising roasting the minerals in the presence of a chloride and with an excess of sulphur containing gases and oxygen to expel all of the chloride and moving the minerals and gases in the same direction throughout the roasting operation.

3. The method of treating sulphur containing minerals to form metallic sulphates, comprising roasting the minerals in the presence of a chloride, decomposing all of the chloride by reaction with the sulphur oxides from the ore, with the liberation of chlorine and moving the minerals and gases in the same direction throughout the roasting operation.

4. The method of treating sulphur containing minerals, comprising roasting the minerals with an oxygen bearing gas in the presence of a chloride to form metallic sulphates free from metallic chlorides and decomposing all the chloride by reaction with sulphur oxides to liberate chlorine, while moving the minerals and gases in the same direction during the roasting operation.

In testimony whereof, we affix our signatures.

MELVILLE F. COOLBAUGH.
JOHN BURNS READ.